(12) United States Patent
Nielsen et al.

(10) Patent No.: US 11,007,529 B2
(45) Date of Patent: May 18, 2021

(54) MICROFLUIDIC APPARATUSES

(71) Applicant: HEWLETT-PACKARD DEVELOPMENT COMPANY, L.P., Houston, TX (US)

(72) Inventors: Jeffrey A Nielsen, Corvallis, OR (US); Manish Giri, Corvallis, OR (US); Chantelle Domingue, Corvallis, OR (US); Kenneth Ward, Corvallis, OR (US); Christie Dudenhoefer, Corvallis, OR (US); Matthew David Smith, Corvallis, OR (US); Joshua M. Yu, Corvallis, OR (US); Hilary Ely, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 188 days.

(21) Appl. No.: 16/099,658

(22) PCT Filed: Jul. 26, 2016

(86) PCT No.: PCT/US2016/044092
§ 371 (c)(1),
(2) Date: Nov. 7, 2018

(87) PCT Pub. No.: WO2018/022022
PCT Pub. Date: Feb. 1, 2018

(65) Prior Publication Data
US 2019/0151848 A1    May 23, 2019

(51) Int. Cl.
*B01L 3/00* (2006.01)
*G01N 15/10* (2006.01)
(Continued)

(52) U.S. Cl.
CPC ....... *B01L 3/502761* (2013.01); *B01L 3/0268* (2013.01); *B01L 3/50273* (2013.01);
(Continued)

(58) Field of Classification Search
None
See application file for complete search history.

(56) References Cited

U.S. PATENT DOCUMENTS 7,051,654 B2   5/2006 Boland et al.
8,691,274 B2   4/2014 Xu et al.
(Continued)

FOREIGN PATENT DOCUMENTS

CN   101533005 A    9/2009
CN   105026932 A   11/2015
(Continued)

OTHER PUBLICATIONS

Gross, Andre, et al. "Technologies for Single-Cell Isolation." International journal of molecular sciences 16, No. 8 (2015): 16897-16919.
(Continued)

*Primary Examiner* — Xiaoyun R Xu
(74) *Attorney, Agent, or Firm* — Perry + Currier Inc

(57) ABSTRACT

According to an example, a microfluidic apparatus may include a fluid slot, a foyer in fluid communication with the fluid slot via a channel having a relatively smaller width than the foyer, a sensor to detect a presence of a particle of interest in a fluid passing through the channel, a nozzle in fluid communication with the foyer, and an actuator positioned in line with the nozzle. The microfluidic apparatus may also include a controller to receive information from the sensor, determine, from the received information, whether a particle of interest has passed through the channel, and control the actuator to expel fluid in the foyer through the nozzle based upon the determination.

16 Claims, 7 Drawing Sheets

(51) Int. Cl.
   *B41J 2/175*     (2006.01)
   *B41J 2/14*      (2006.01)
   *G01N 35/10*     (2006.01)
   *B01L 3/02*      (2006.01)
   *G01N 15/14*     (2006.01)

(52) U.S. Cl.
   CPC ........... *B41J 2/14153* (2013.01); *B41J 2/175* (2013.01); *G01N 15/1031* (2013.01); *G01N 15/1056* (2013.01); *G01N 15/1484* (2013.01); *G01N 35/1016* (2013.01); *G01N 35/1065* (2013.01); *B01L 2200/0652* (2013.01); *B01L 2300/0627* (2013.01); *B01L 2300/0645* (2013.01); *B01L 2300/0663* (2013.01); *B01L 2400/04* (2013.01); *G01N 2015/1006* (2013.01); *G01N 2035/1041* (2013.01); *G01N 2035/1062* (2013.01)

(56) References Cited

U.S. PATENT DOCUMENTS

| | | |
|---|---|---|
| 8,834,793 B2 | 9/2014 | Koltay et al. |
| 2003/0215957 A1 | 11/2003 | Lemmo et al. |
| 2008/0102537 A1 | 5/2008 | Harding et al. |
| 2009/0208466 A1 | 8/2009 | Yoo et al. |
| 2012/0084022 A1 | 4/2012 | Giovangrandi et al. |
| 2015/0064694 A1 | 3/2015 | Sadri |
| 2016/0011096 A1 | 1/2016 | Vacca |

FOREIGN PATENT DOCUMENTS

| | | |
|---|---|---|
| WO | WO-2011099287 A1 | 8/2011 |
| WO | WO-2014013802 A1 | 1/2014 |
| WO | WO-2014074456 A1 | 5/2014 |
| WO | WO-2014178827 A1 | 11/2014 |
| WO | WO-2016042722 A1 | 3/2016 |

OTHER PUBLICATIONS

Yusof, Azmi, et al. "Towards a microfluidic dispenser chip for printing of single cells." In Micro Electro Mechanical Systems (MEMS), 2011 IEEE 24th International Conference on, pp. 1059-1062, IEEE 2011.

Yusoh, Azmi, et al. "Inkjet-like printing of single-cells." Lab on a chip 11, No. 14 (2011): 2447-2454.

Andre Gross et al. "Single-Cell Printer: Automated, On Demand, and Label Free" Journal of Laboratory Automation Society for Laboratory Automation and Screening, Nov. 12, 2013 (Nov. 12, 2013), pp. 504-518, XP055276802, Retrieved from the Internet: URL:http://jla.sagepub.com/content/18/6/504.full.pdf [retrieved on May 31, 2016].

J. Schoendube et al. "Single-cell printing based on impedance detection", Biomicrofluidics, vol. 9, No. 1, Feb. 11, 2015 (Feb. 11, 2015), p. 014117, XP055575870, DOI: 10.1063/1.4907896.

MICROFLUIDIC APPARATUSES

BACKGROUND

Microfluidics applies across a variety of disciplines including engineering, physics, chemistry, microtechnology and biotechnology. Microfluidics involves the study of small volumes, e.g., microliters, picoliters, or nanoliters, of fluid and how to manipulate, control and use such small volumes of fluid in various microfluidic systems and devices such as microfluidic devices or chips. For example, microfluidic biochips (which may also be referred to as a "lab-on-chip") are used in the field of molecular biology to integrate assay operations for purposes such as analyzing enzymes and DNA, detecting biochemical toxins and pathogens, diagnosing diseases, etc.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
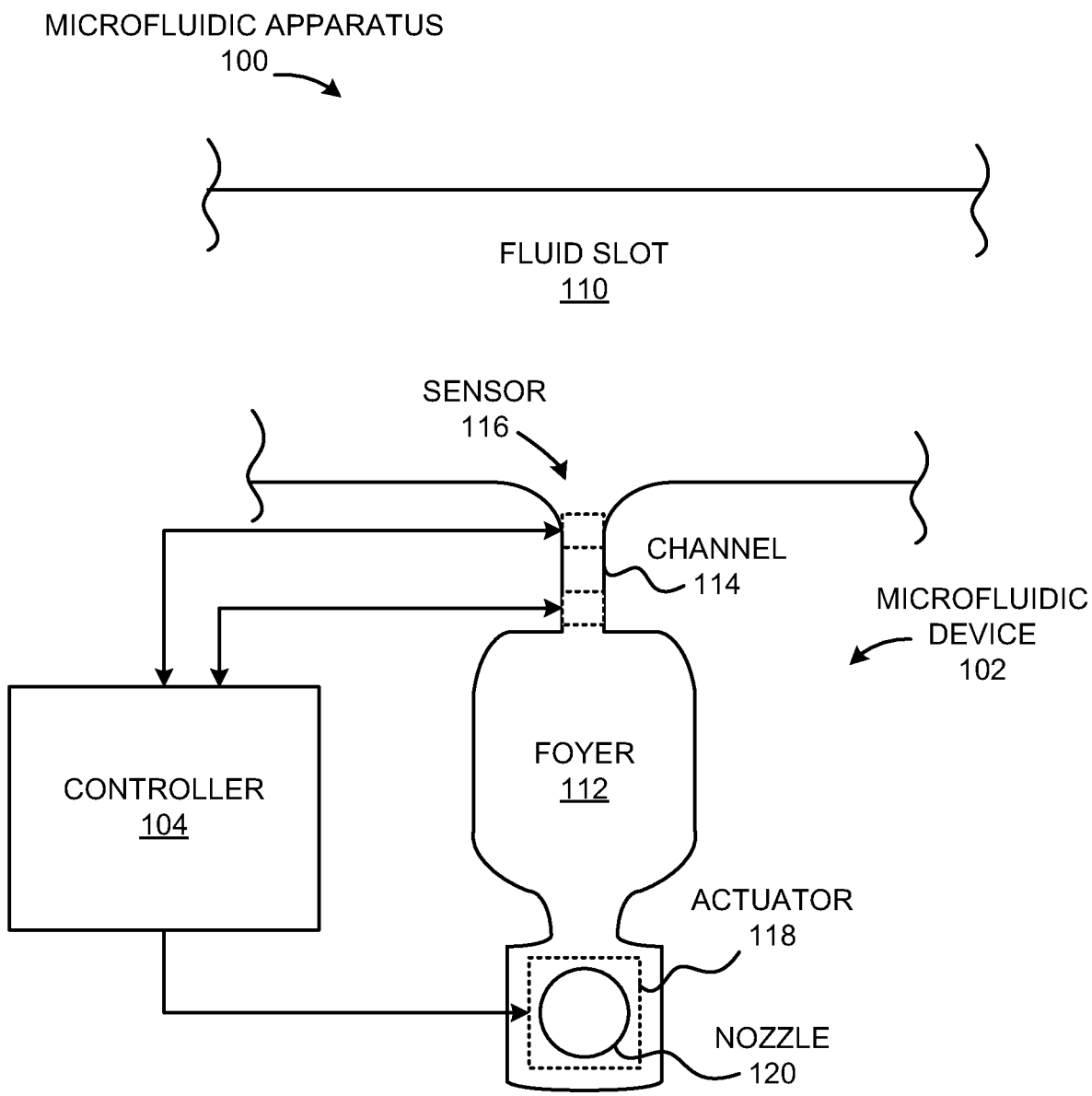
FIG. 1A shows a simplified block diagram of an example microfluidic apparatus.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are microfluidic apparatuses containing a microfluidic device or multiple microfluidic devices and methods for implementing the microfluidic device or devices. A microfluidic system disclosed herein may also include the microfluidic apparatus or a plurality of similarly configured microfluidic apparatuses. A microfluidic device may include a channel through which fluid from a fluid slot is to flow into a foyer (or equivalently, a chamber) from which the fluid may be dispensed through a nozzle in the foyer. A sensor may be positioned to detect the passage of a particle of interest, e.g., a cell, through the channel and into the foyer. A controller may determine, from information received from the sensor, when a particle of interest has passed through the channel and is in the foyer. Based upon this determination, the controller may control an actuator that may cause the fluid and the particle of interest contained in the foyer to be dispensed through the nozzle to control delivery of the particle of interest from the microfluidic apparatus.

According to an example, the controller may control the number of particles of interest that are dispensed to a particular location, e.g., a particular well in receiving plate, by controlling the location at which the fluid in the foyer is dispensed following detection of the particle of interest. For instance, the controller may cause a preselected number of particles of interest to be dispensed into a particular well prior to dispensing other particles of interest into another well. As another example, the controller may determine from information communicated by the sensor, a type of the particle of interest that has moved through the channel. Based upon this determination, the controller may vary the location at which the fluid in the foyer is dispensed. For instance, the controller may cause fluid containing a first type of cell to be dispensed into a first well and fluid containing a second type of cell to be dispensed into a second well.

According to another example, the controller may activate an actuator to cause the actuator to be pulsed such that each pulse of the actuator may cause a portion of the fluid contained in the foyer to be expelled through the nozzle. In this example, the controller may continuously determine the presence and passage of particles of interest through the channel and the controller may continue to pulse the actuator until the controller determines that a preselected number of particles of interest has been expelled through the nozzle.

Through implementation of the microfluidic devices and methods disclosed herein, particles of interest may be dispensed in a closed-loop manner such that specific quantities of the particles of interest per dispensing location may be dispensed. By way of particular example, the particles of interest are cells, which are the basic structural and functional unit of an organism. Most animal and plant cells range in size from 1-100 micrometers and contain vital health information. In many instances, cell-based diagnostics are the gold standard for detecting infection diseases (HIV, Malaria, Tuberculosis), as well as chronic diseases (cancer, cardiac diseases, autoimmune diseases). The microfluidic devices and methods described herein may be used to provide a configurable and mobile platform for health diagnostics.

With reference first to FIG. 1A, there is shown a simplified block diagram of an example microfluidic apparatus 100. It should be understood that the microfluidic apparatus 100 depicted in FIG. 1A may include additional components and that some of the components described herein may be removed and/or modified without departing from a scope of the microfluidic apparatus 100 disclosed herein.

The microfluidic apparatus 100 is depicted as including a microfluidic device 102 and a controller 104. The microfluidic device 102 is depicted as including a fluid slot 110 and a foyer 112, in which the foyer 112 is in fluid communication with the fluid slot 110 via a channel 114. A portion of the fluid slot 110 is shown and may supply fluid to multiple microfluidic devices 102 housed in the microfluidic apparatus 100. The channel 114 is depicted as having a relatively smaller width than the foyer 112 such that the channel 114 may be considered as being pinched with respect to the foyer 112. Although the channel 114 has been depicted as having a linear configuration, the channel 114 may include other shapes, such as a curved shape, a snake-like shape, a shape with corners, combinations thereof, or the like.

A sensor 116 may be positioned to detect a property of a fluid flowing from the fluid slot 110 and into the foyer 112 through the channel 114. As discussed in greater detail herein, the sensor 116 may detect a presence of a particle of interest, e.g., a cell or other particle, in the fluid as the fluid passes through the channel 114. For instance, the fluid contained in the fluid slot 110 may be a host fluid having particles (e.g., a blood sample containing cells, an ink containing pigments/particles, or the like).

The sensor 116 may be an impedance sensor formed using known semiconductor techniques and may be implemented using alternating current (AC) or direct current (DC) sensing. The sensor 116 may detect impedance changes as particles in the fluid pass by the sensor 116 through the channel 114. In this example, the sensor 116 may include metal electrodes that may form an electrical field through which the particles may pass. In another example, the sensor 116 may include a photodetector, e.g., a laser source and a photodiode, and may detect cells or particles based upon detected changes in light.

The microfluidic device 102 is also depicted as including an actuator 118 and a nozzle 120 in fluid communication with the foyer 112. As shown, the actuator 118 may be positioned in line with the nozzle 120. For instance, the actuator 118 may be positioned directly above or below the nozzle 120. In addition, activation of the actuator 118 may cause some of the fluid contained in the foyer 112 to be dispensed or expelled out of the microfluidic device 102 through the nozzle 120. In general, the structures and components of the microfluidic device 102 may be fabricated using conventional integrated circuit microfabrication techniques such as electroforming, laser ablation, anisotropic etching, sputtering, dry and wet etching, photolithography, casting, molding, stamping, machining, spin coating, laminating, and the like. By way of particular example, the structures and components of the microfluidic device 102 may be formed of silicon.

According to an example, the controller 104 may supply power, e.g., AC or DC, to the sensor 116 and may detect, based upon measurements obtained by the sensor 116, when a particle of interest, e.g., a cell, a particular type of cell, etc., has passed through the channel 114. In addition, the sensor 116 may provide information, e.g., an electrical output signal representing the sensor data, to the controller 104. In response to a determination that a particle of interest has passed through the channel 114, the controller 104 may activate the actuator 118 to expel fluid contained in the foyer 112 through the nozzle 120. In another example, the controller 104 may continuously activate the actuator 118 until the controller 104 determines that a preselected number of the particles of interest has been expelled. In one regard, therefore, the controller 104 may control the actuator 118 in a closed-loop feedback manner based upon the detected particle of interest or multiple detected particles of interest. The actuator 118 may be a thermal resistor that produces vapor bubbles to create fluid displacement within the foyer 112. In other examples, the actuator 118 may be implemented as piezo elements (e.g., PZT) whose electrically induced deflections generate fluid displacements within the foyer 112. In still other examples, the actuator 118 may be other types of deflective membrane elements activated by electrical, magnetic, and other forces.

The controller 104 may activate the actuator 118 a predefined number of times to expel the sensed particle of interest from the foyer 112 in instances in which less than all of the fluid contained in the foyer 112 is expelled during a single activation of the actuator 118. The predefined number of times may correspond to the number of times that the actuator 118 is to be activated in order to expel most or all of the fluid contained in the foyer 112 immediately following detection of the particle of interest. That is, for instance, the predefined number of times may correspond to the number of times that the actuator 118 is to be activated in order to cause the particle of interest contained in the foyer 112 to be expelled.

The controller 104 may be a computing device, a semiconductor-based microprocessor, a central processing unit (CPU), an application specific integrated circuit (ASIC), and/or other hardware device. The controller 104 may receive power from a power source or a power supply (not shown) and may supply AC or DC power to the sensor 116.

Figure 1B:
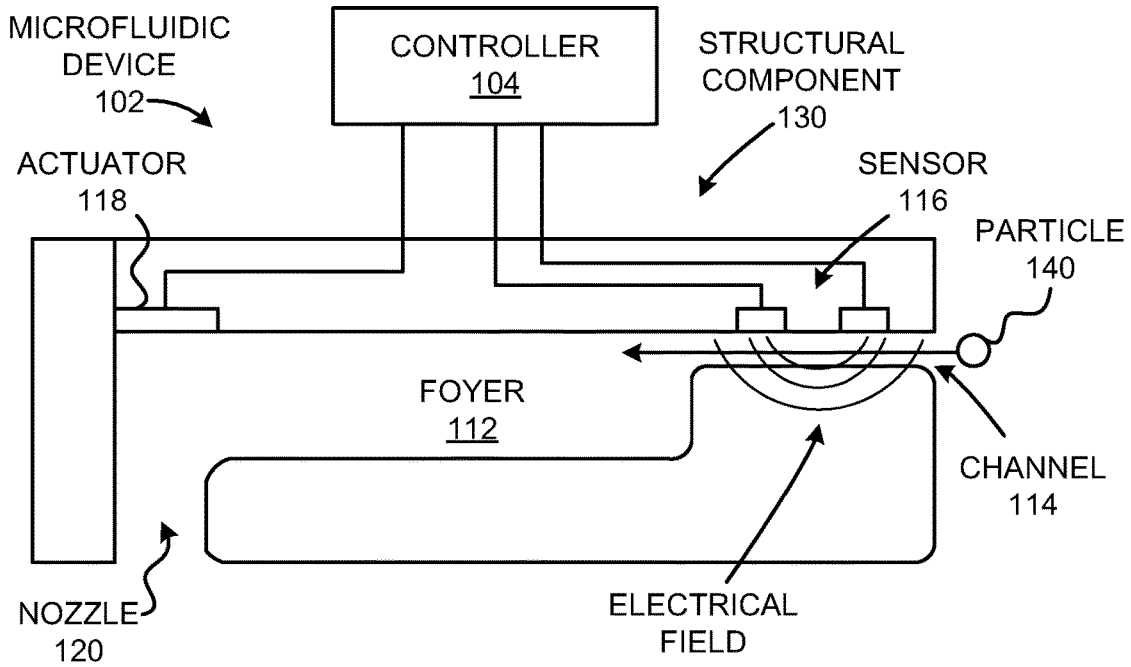
FIG. 1B shows a simplified cross-sectional side view of the example microfluidic device shown in FIG. 1A.

Turning now to FIG. 1B, there is shown a simplified cross-sectional side view of the example microfluidic device 102 shown in FIG. 1A. The microfluidic device 102 may be formed of a structural component 130, which may be formed of silicon, a polymeric material, an epoxy-based negative photoresist (such as SU-8), or the like. The structural component 130 may be formed through implementation of microfabrication techniques such as electroforming, laser ablation, anisotropic etching, sputtering, dry and wet etching, photolithography, casting, molding, stamping, machining, spin coating, laminating, and the like. In any regard, the actuator 118 and the components of the sensor 116 may be formed into the structural component through integrated circuit fabrication techniques. In addition, the channel 114 and the nozzle 120 may be formed through the structural component 130, for instance, by etching.

According to an example, the channel 114 may have a cross-section that is sized such that a single particle, e.g., cell, may pass through the channel 114 at one time. In this example, the channel 114 may be sized based upon the size of the particle 140 and may be slightly larger than the particle 140. By way of particular example, the channel 114 may have a height and a width that ranges from between about 5 microns and about 100 microns and a length that ranges from between about 5 microns and about 500 microns. As used herein, the term "about" may be defined as being between ±2 microns and ±100 microns. The nozzle 120 may be sized such that fluid contained in the foyer 112 may substantially be prevented from unintentionally being dispensed through the nozzle 120. That is, for instance, the nozzle 120 may be sized such that surface tension of the fluid prevents the fluid from being expelled by gravitational forces while allowing a predetermined amount of fluid to be expelled when the actuator 118 is activated. In addition, the nozzle 120 may be sized such that a portion of the fluid contained in the foyer 112 may evaporate through the nozzle 120.

The controller 104 may supply power to the sensor 116, which may generate an electrical field 132. As fluid containing a particle of interest, or simply particle 140, such as a cell, is moved through the channel 114 as indicated by the arrow, the electrical field 132 may be disturbed. The amount of disturbance, e.g., change in impedance, detected by the sensor 116 may vary depending upon the type of particle 140 detected. For instance, a first type of cell may cause a first change in impedance to be detected, a second type of cell may cause a second change in impedance to be detected, etc. In other examples in which the sensor 116 includes a light source and a photodetector, particles 140 having different characteristics may cause different changes in the detected light. In these examples, one of the sensor 116 elements may be provided on a top of the channel 114 and another one of the sensor 116 elements may be provided on a bottom of the channel 114.

In any regard, the controller 104 may receive information from the sensor 116 pertaining to the detected particle 140. The controller 104 may determine that a particle 140 has passed through the channel 114 based upon the received information. In other words, the controller 104 may determine that the particle 140 has passed through the channel 114 and is in the foyer 112 from the received information. The particle 140, and thus, the fluid in which the particle 140 is contained, may be moved through the channel 114 from the fluid slot 110 (shown in FIG. 1A) as fluid contained in the foyer 112 is expelled through the nozzle 120. The fluid contained in the foyer 112 may be expelled through the nozzle 120 when the actuator 118 is activated. In another example, the fluid contained in the foyer 112 may be expelled through the nozzle 120 through evaporation of a portion of the fluid through the nozzle 120.

The fluid contained in the foyer 112 may not be completely expelled when the actuator 118 is activated. According to an example, the controller 104 may cause the actuator 118 to be activated a predetermined number of times to cause all or substantially all of the fluid contained in the foyer 112 to be expelled following a determination that a particle of interest 140 has passed through the channel 114 and is in the foyer 112. The predetermined number of times may be equivalent to a number of times that may result in the clearing of the fluid contained in the foyer 112 to ensure that the particle of interest 140 is expelled from the foyer 112. Thus, for instance, if a single activation of the actuator 118 results in a quarter of the fluid contained in the foyer 112 to be expelled, the controller 104 may cause the actuator 118 to be activated four times following a determination that the particle of interest 140 has passed through the channel 114. As another example, the controller 104 may cause the actuator 118 to be activated the predetermined number of times following a determination that the preselected number of particles of interest 140 has moved through the channel 114 and into the foyer 112 and prior to stopping activation of the actuator 118 to ensure that the last detected particle of interest 140 has been expelled through the nozzle 120.

Figure 2:
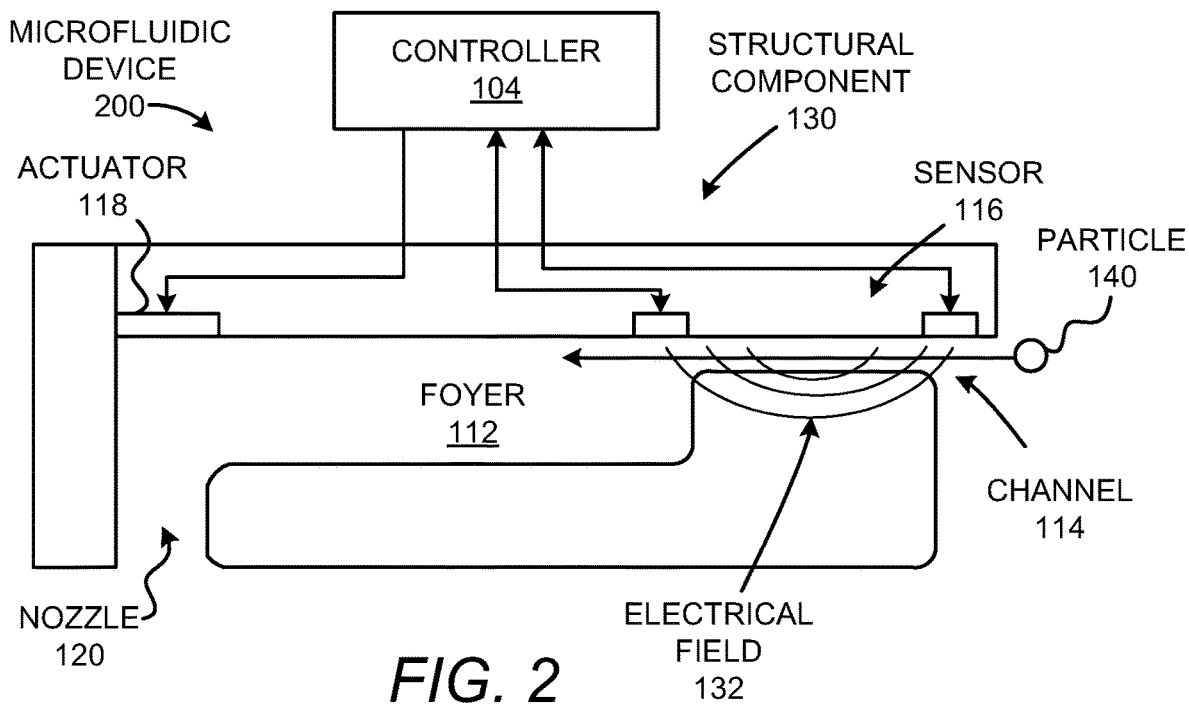
FIG. 2 shows a simplified cross-sectional side view of another example microfluidic device.

Turning now to FIG. 2, there is shown a simplified cross-sectional side view of another example microfluidic device 200. The microfluidic device 200 shown in FIG. 2 includes most of the same features as the microfluidic device 102 depicted in FIG. 1B and thus, common features will not be described in detail. The microfluidic device 200 shown in FIG. 2, however, differs from the microfluidic device 102 depicted in FIG. 1B in that the sensor 116 elements are positioned outside of the channel 114. That is, one of the sensor 116 elements is depicted as being positioned at an inlet of the channel 114 and the other one of the sensor 116 elements is depicted as being positioned at an outlet of the channel 114.

Figure 3:
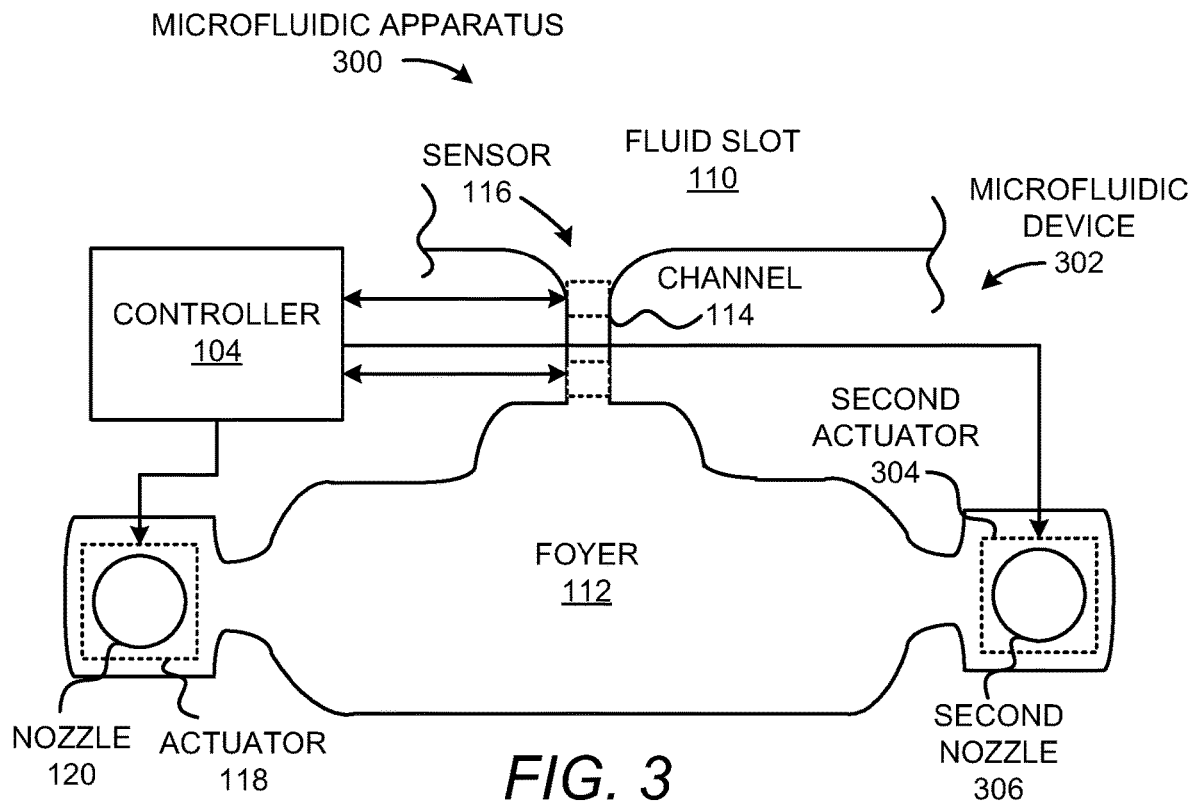
FIG. 3 shows a simplified block diagram of another example microfluidic apparatus.

Turning now to FIG. 3, there is shown a simplified block diagram of another microfluidic apparatus 300. The microfluidic apparatus 300 shown in FIG. 3 includes most of the same features as the microfluidic apparatus 100 depicted in FIG. 1A and thus, common features will not be described in detail. The microfluidic apparatus 300 shown in FIG. 3, however, differs from the microfluidic apparatus 100 depicted in FIG. 1A in that the microfluidic device 302 includes different features as compared with the microfluidic device 102. Particularly, the microfluidic device 302 may include a second actuator 304 and a second nozzle 306. The second actuator 304 may be positioned in-line with the second nozzle 306 and may be positioned on an opposite side of the foyer 112 with respect to the actuator 118. The second actuator 304 may also be implemented as similar types of actuators as the actuator 118, e.g., thermal resistor, PZT, etc.

As also shown in FIG. 3, the controller 104 may control the second actuator 304, e.g., through a communication or signal line. That is, the controller 104 may supply energy to the second actuator 304 to cause the second actuator 304 to become activated and therefore cause some of the fluid contained in the foyer 112 to be expelled through the second nozzle 306. The controller 104 may activate the actuator 118 and the second actuator 304 in a sequence in response to a detection that a particle of interest has passed through the channel 114 and into the foyer 112. In addition, the controller 104 may activate the actuator 118 and the second actuator 304 a predetermined number of times until a volume of fluid equal to or substantially equal to the volume of fluid contained in the foyer 112 at the time the particle of interest was detected to have moved through the channel 114 has been expelled from the foyer 112.

According to an example, the second nozzle 306 may function as a pressure relief during activation of the actuator 118 and the nozzle 120 may function as a pressure relief during activation of the second actuator 304. That is, when the actuator 118 (or the second actuator 304) is activated, pressure may be applied to the fluid contained in the foyer 112, which may cause some of the fluid to be forced back through the channel 114. A portion of the fluid contained in the foyer 112 may be expelled through the second nozzle 306 when the actuator 118 is activated to prevent the fluid from being forced back through the channel 114.

Although the microfluidic devices 102 and 302 have been depicted as respectively having a single actuator 118 and two actuators 118, 302, it should be understood that the microfluidic apparatuses 100, 300 disclosed herein may include a larger number of actuators and corresponding nozzles without departing from a scope of the present disclosure.

Figure 4:
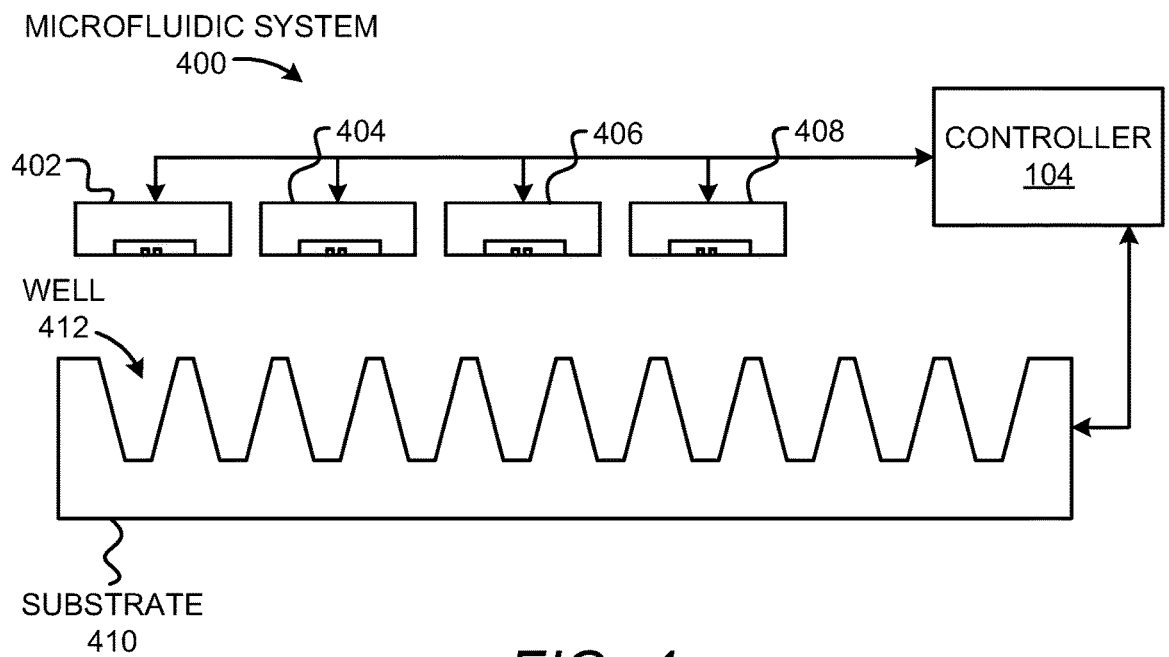
FIG. 4 shows a simplified block diagram of an example microfluidic system.

Turning now to FIG. 4, there is shown a simplified block diagram of an example microfluidic system 400. The microfluidic system 400 is depicted as including a plurality of microfluidic apparatuses 402-408, a substrate 410, and the controller 104. Each of the microfluidic apparatuses 402-408 may be configured as shown in either of FIGS. 1A and 3 and may each contain a plurality of microfluidic devices. The microfluidic devices may each be configured as shown in any of FIGS. 1A-3. For instance, each of the microfluidic apparatuses 402-408 may contain 6 or more microfluidic devices 102, 200, 302.

The substrate 410 is depicted as including a plurality of wells 412. According to an example, the substrate 410 may be movable in one dimension, two dimensions, or three-dimensions with respect to the microfluidic apparatuses 402-408. In this example, the controller 104 may control a motor or other actuator to move the substrate 410 with respect to the microfluidic apparatuses 402-408. For instance, the controller 104 may cause the substrate 410 to be moved such that a particular well 412 is positioned beneath a particular one of the microfluidic apparatuses 402-408. In this regard, different fluids may be inserted into each of the microfluidic apparatuses 402-408 and the controller 104 may individually control the microfluidic devices contained in the microfluidic apparatuses 402-408 to dispense the fluids into selected ones of the wells 412.

By way of particular example, the controller 104 may control the microfluidic devices to dispense a predetermined number of particles, e.g., cells, into individual wells 412. That is, the controller 104 may determine when a preselected number of particles of interest 140 has flowed through a channel in a microfluidic device and may control activation of an actuator 118 until the preselected number of particles of interest 140 has been dispensed into a particular well 412. The controller 104 may also move the substrate 410 such that a different well 412 is positioned beneath the microfluidic apparatus 402 containing the microfluidic device following a determination that the preselected number of particles of interest has been dispensed into the particular well 412. The controller 104 may also determine the type of particle that has flowed through the channel and may control the position of the substrate 410 such that different types of particles are dispensed into different ones of the wells 412.

Figure 5:
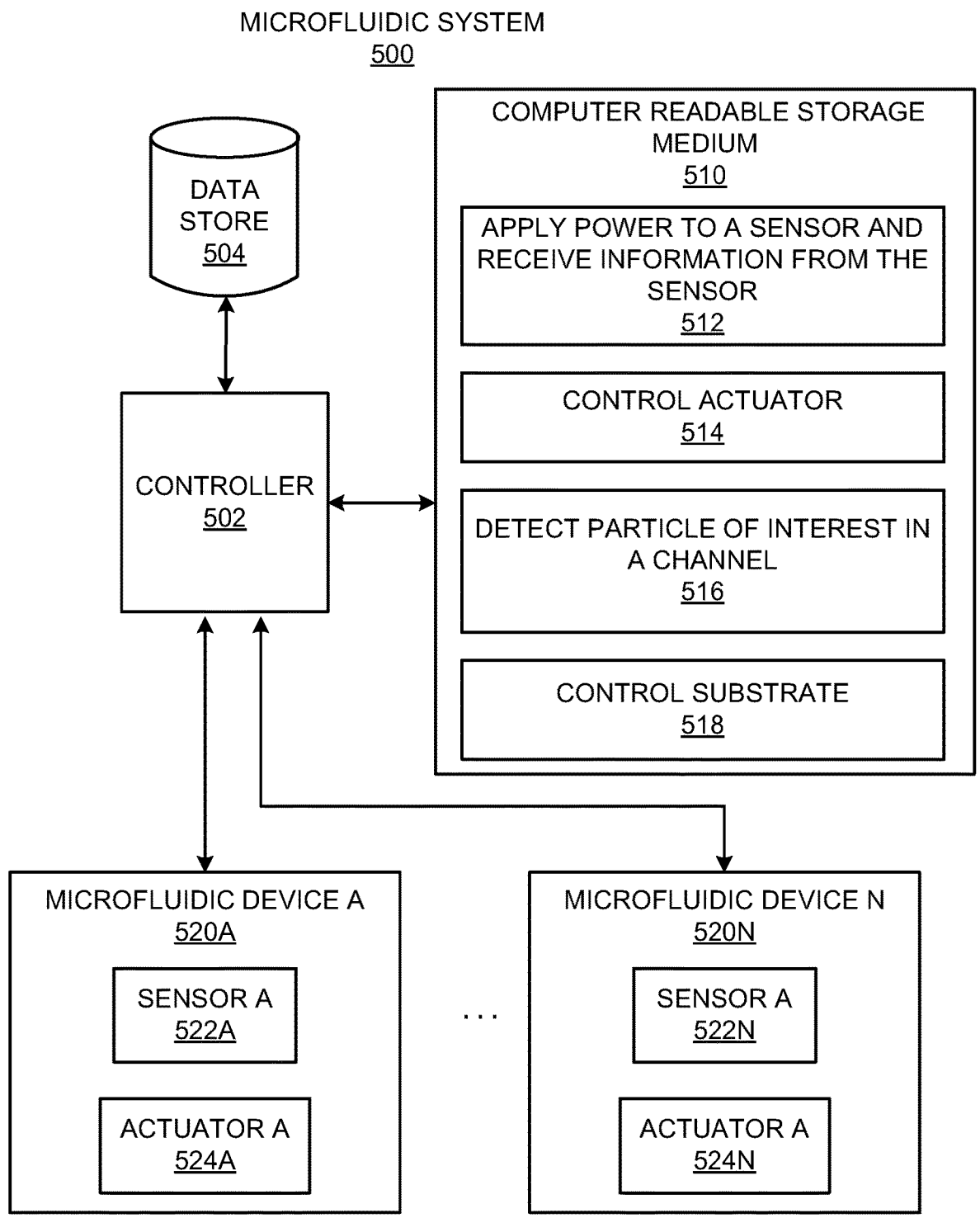
FIG. 5 depicts a simplified block diagram of an example microfluidic system.

With reference now to FIG. 5, there is shown a simplified block diagram of an example microfluidic system 500. It should be understood that the microfluidic system 500 depicted in FIG. 5 may include additional components and that some of the components described herein may be removed and/or modified without departing from a scope of the microfluidic system 500 disclosed herein.

The microfluidic system 500 is shown as including a controller 502 and a data store 504. The controller 502 may be the same as the controller 104 depicted in and described above with respect to FIG. 1A. The controller 502 may thus be a computing device, a semiconductor-based microprocessor, a central processing unit (CPU), an application specific integrated circuit (ASIC), a programmable logic device (PLD), and/or other hardware device. The controller 502 may also receive power from a power source or a power supply (not shown). The data store 504 may be Random Access Memory (RAM), an Electrically Erasable Programmable Read-Only Memory (EEPROM), a storage device, an optical disc, or the like.

The microfluidic system 500 may also include a computer readable storage medium 510 on which is stored machine readable instructions 512-518 that the controller 502 may execute. More particularly, the controller 502 may fetch, decode, and execute the instructions 512 to apply power to a sensor or to multiple sensors and to receive information from the sensor or multiple sensors 116. The controller 502 may fetch, decode, and execute the instructions 514 to control an actuator to continuously be pulsed until the controller 502 determines that a preselected number of particles of interest has passed through a channel or multiple channels 114. The controller 502 may fetch, decode, and execute the instructions 516 to detect a particle of interest in a channel, e.g., to detect whether a particle of interest has passed through a channel. The controller 502 may fetch, decode, and execute the instructions 518 to control a substrate 410 to position a selected well 412 to receive fluid from a microfluidic device. As another example or in addition to retrieving and executing instructions, the controller 502 may include one or more electronic circuits that include components for performing the functionalities of the instructions 512-518.

The computer readable storage medium 510 may be any electronic, magnetic, optical, or other physical storage device that contains or stores executable instructions. Thus, the computer readable storage medium 510 may be, for example, Random Access Memory (RAM), an Electrically Erasable Programmable Read-Only Memory (EEPROM), a storage device, an optical disc, and the like. The computer readable storage medium 510 may be a non-transitory machine-readable storage medium, where the term "non-transitory" does not encompass transitory propagating signals.

The microfluidic system 500 may further include a plurality of microfluidic devices 520*a*-520*n*, in which the variable "n" represents an integer value greater than one. Each of the microfluidic devices 520*a*-520*n* may be similar to one of the microfluidic devices 102, 200, 302 depicted in FIGS. 1A-3. In this regard, the microfluidic devices 520*a*-520*n* may each include a sensor 522*a*-522*n* and an actuator 524*a*-524*n*. In other examples, for instance, in microfluidic devices 302 having multiple actuators, the microfluidic devices 520*a*-520*n* may each include multiple actuators 524*n*. In addition, or as another example, the microfluidic devices 520*a*-520*n* may include multiple sensors 522*a*-522*n*.

In some examples, the microfluidic devices 520*a*-520*n* are housed in a single microfluidic apparatus. In some examples, a first group of the microfluidic devices 520*a*-520*n* is housed in a first microfluidic apparatus and a second group of the microfluidic devices 520*a*-520*n* is housed in a second microfluidic apparatus.

Various manners in which the microfluidic system 500 may be implemented are discussed in greater detail with respect to the methods 600, 620, 700, and 800 respectively depicted in FIGS. 6A, 6B, 7, and 8. Particularly, FIGS. 6A, 6B, 7, and 8, respectively, depict example methods 600, 620, 700 and 800 for delivering fluid from a microfluidic device. It should be apparent to those of ordinary skill in the art that the methods 600, 620, 700 and 800 may represent generalized illustrations and that other operations may be added or existing operations may be removed, modified, or rearranged without departing from the scopes of the methods 600, 620, 700 and 800.

The descriptions of the methods 600, 620, 700 and 800 are made with reference to the microfluidic system 500 illustrated in FIG. 5 for purposes of illustration. It should, however, be clearly understood that microfluidic systems having other configurations may be implemented to perform any of the methods 600, 620, 700 and 800 without departing from scopes of the methods 600, 620, 700 and 800.

Figure 6A:
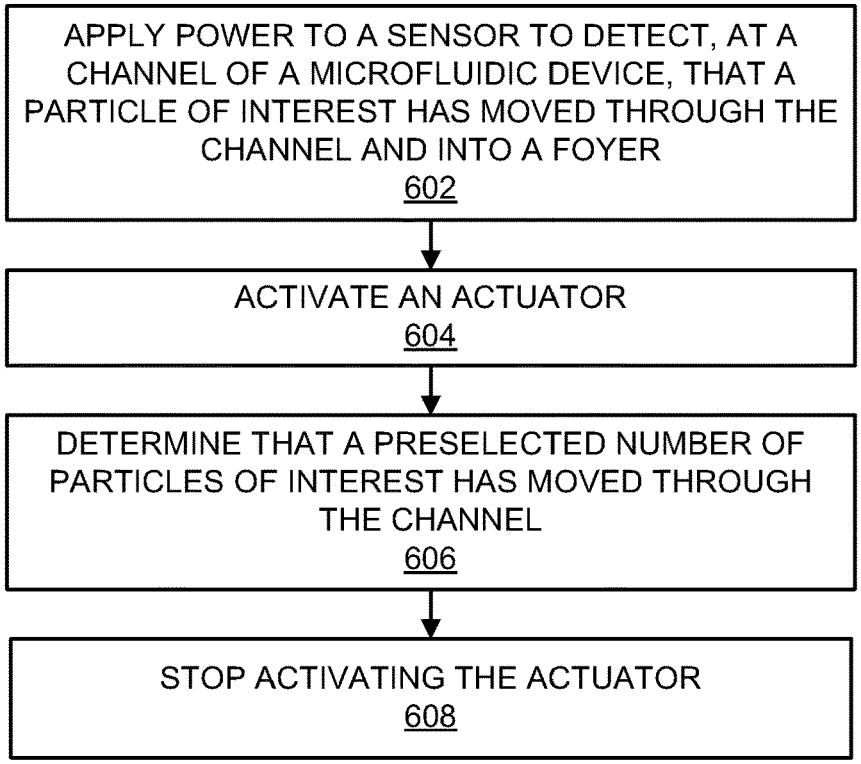
FIGS. 6A, 6B, 7, and 8, respectively, depict example methods for delivering fluid from a microfluidic device.

With reference first to FIG. 6A, at block 602, power may be applied to a sensor 522*a* to detect, at a channel 114 of a microfluidic device 520*a*, that a particle of interest 140 has moved through the channel 114 and into a foyer of the microfluidic device 520*a*. The controller 502 may execute the instructions 512 to apply power to the sensor 522*a*.

At block 604, an actuator 524*a* may be activated to cause fluid containing the particle of interest 140 to be expelled from the foyer through a nozzle of the microfluidic device 520*a*. The controller 502 may execute the instructions 514 to control the actuator 524*a* to be activated in a continuous manner, e.g., pulsed.

At block 606, a determination may determine that a preselected number of particles of interest 140 has moved through the channel 114. For instance, the controller 502 may execute the instructions 516 to detect that a particle of interest 140 has passed through the channel 114. The controller 502 may detect, e.g., from information received from the sensor 522*a*, when particles of interest 140 have passed through the channel 114 and may determine when the preselected number of particles of interest 140 has been determined to have moved through the channel 114.

At block 608, in response to a determination that the preselected number of particles of interest 140 has moved through the channel 114, the controller 502 may stop activating the actuator 524*a*. The controller 502 may execute the instructions 514 to control the actuator 524a to stop activating the actuator. In one regard, the controller 502 may cause the preselected number of particles of interest 140, which may include a single particle of interest 140, to be expelled through the nozzle.

Figure 6B:
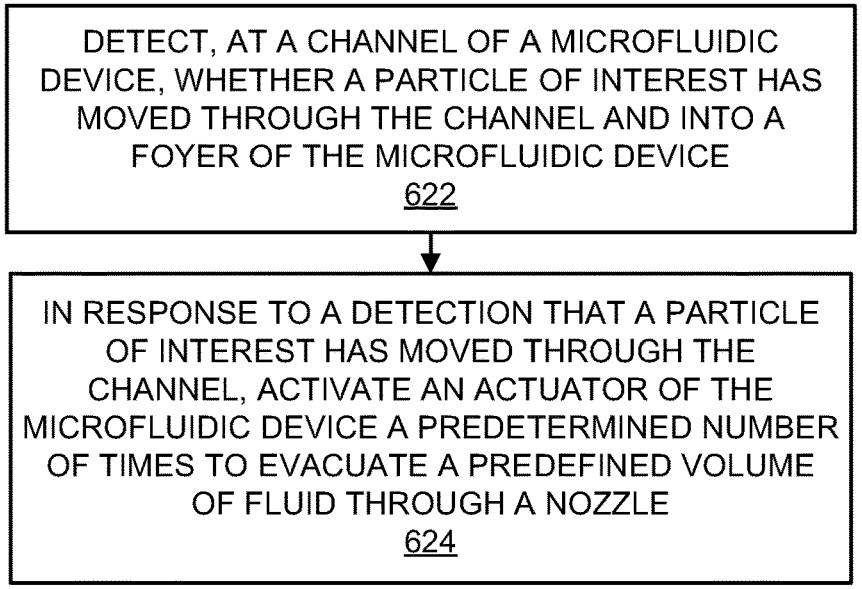

With reference now to FIG. 6B, at block 622, a detection may be made, at a channel 114 of a microfluidic device 520a, as to whether a particle of interest 140 has moved through the channel 114 and into a foyer 112 of the microfluidic device 520a. For instance, a sensor 522a may detect whether a particle of interest 140 has passed through a channel 114 of the microfluidic device 520a as discussed above. The controller 502 may execute the instructions 512 to receive information pertaining to the detected particle of interest 140 from the sensor 116. The controller 502 may also execute the instructions 514 to detect or determine that the particle of interest 140 has moved through the channel 114 from the information.

At block 624, in response to a detection that a particle of interest 140 has moved through the channel 114, an actuator 524a of the microfluidic device 520a may be activated a predetermined number of times to evacuate a predefined volume of fluid through a nozzle 120 from the foyer 112, in which the predefined volume of fluid is equivalent or nearly equivalent to a total volume of fluid contained in the foyer 112 prior to the foyer 112 being refilled with additional fluid. For instance, the controller 502 may execute the instructions 514 to control the actuator 524a, e.g., activate the actuator 524a, in response to a determination that the particle of interest 140 has passed through the channel 114 and has entered the foyer 112. The controller 502 may activate the actuator 524a a predetermined number of times to ensure that the particle of interest 140 has been expelled through the nozzle 120. In this regard, the controller 502 may deliver a single particle of interest 140 to a desired location, e.g., a predetermined well 412 (FIG. 4). The controller 502 may repeat blocks 622 and 624 until a predefined number of particles of interest 140 is delivered to a desired location. In this regard, the controller 502 may operate in a closed-loop manner to control the number of particles of interest 140 that are delivered to desired locations, e.g., wells 412 in a substrate 410.

There may be instances in which more than one particle of interest 140 passes through the channel 114. In these instances, the controller 502 may cause the fluid in the foyer 112 in which the multiple particles of interest 140 are contained to be discarded or delivered to another location. The controller 502 may repeat this process until the controller 502 determines that a single particle of interest 140 has passed through the channel 114, at which point the controller 502 may activate the actuator 524a to cause the particle of interest 140 to be dispensed to a desired location.

Figure 7:
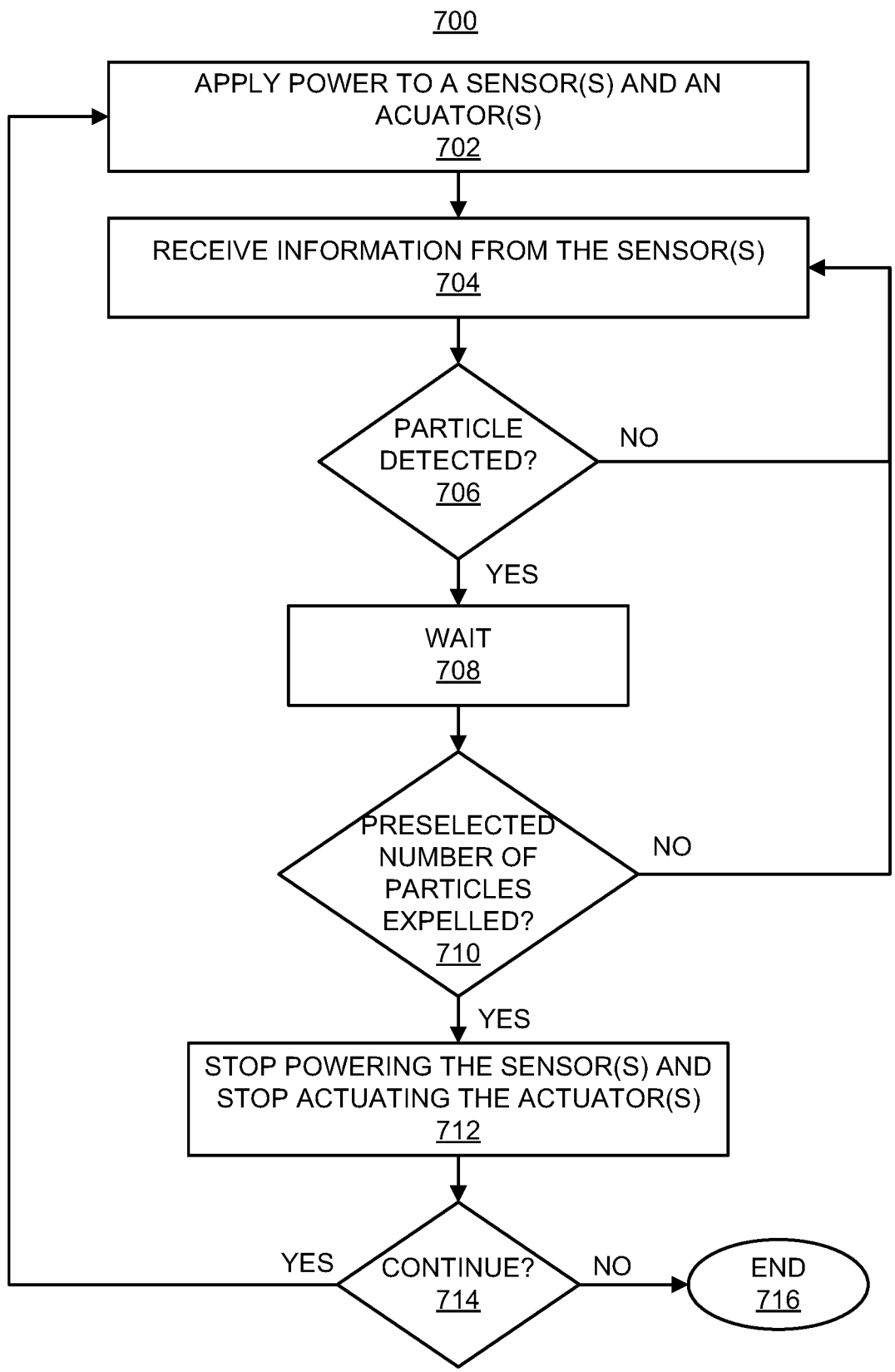

Turning now to FIG. 7, at block 702, power may be applied to a sensor 522a and to an actuator 524a of a microfluidic device 520a. The controller 502 may execute the instructions 512 to apply power to the sensor 522a and the actuator 524a. Application of the power to the sensor 522a may cause the sensor 522a to generate an electric field or other detection field, e.g., a laser beam and photodetector. As noted herein, the sensor 522a may be positioned to detect movement of a particle of interest 140 through a channel 114 of a microfluidic device 102, 200, 302. In addition, application of power to the actuator 524a may cause the actuator 524a to actuate, e.g., pulse, at preset intervals of time. As also noted herein, actuation of the actuator 524a may cause a portion of the fluid in the foyer 112 to be expelled through a nozzle 118.

At block 704, the controller 502 may receive information from the sensor 522a. For instance, the controller 502 may receive detected impedance information, information pertaining to changes in light detected by a photodetector, or the like. As another example, the controller 502 may simply receive detected signals and the controller 502 may determine the change in impedance or other detected change caused by a particle of interest 140.

At block 706, the controller 502 may determine whether a particle of interest 140 has been detected. That is, for instance, the controller 502 may determine that a particle of interest 140 has been detected in response to the information received from the sensor 522a indicating an impedance change that exceeds a predetermined value. As another example, the controller 502 may make this determination in response to a change in a detected illumination value exceeding a predetermined value.

In response to a determination at block 706 that a particle of interest 140 has not been detected, the controller 502 may continue to receive information from the sensor 522a at block 704 and continue to determine whether a particle of interest 140 has been detected. However, in response to a determination at block 706 that a particle of interest 140 has been detected, the controller 502 may wait as indicated at block 708. In one example, the controller 502 may wait until the actuator 524a has been actuated a predetermined number of times sufficient to cause the particle of interest 140 to be expelled from the foyer 112. In another example, the controller 502 may wait for a predetermined length of time sufficient to ensure that the particle of interest 140 has been expelled from the foyer 112.

Following the waiting period at block 708, the controller 502 may determine whether a preselected number of particles of interest 140 has been expelled from the microfluidic device 520a. In response to a determination that a preselected number of particles of interest 140 has not been expelled from the microfluidic device 520a, the controller 502 may continue to receive information from the sensor 522a at block 704 and may repeat blocks 706-710 until the controller 502 determines that the preselected number of particles 140 has been expelled at block 710. Thus, for instance, the controller 502 may repeat blocks 704-710 until the preselected number of particles of interest 140 has been delivered into a particular well 412.

In response to a determination that the preselected number of particles 140 has been expelled at block 710, the controller 502 may stop applying power to the sensor 522a and may stop actuating the actuator 524a as indicated at block 712.

At block 714, the controller 502 may determine whether to continue the method 700. The controller 502 may determine that the method 700 is to be continued in response to a determination that an additional particle of interest 140 is to be delivered into an additional well 412. In response to a determination that the method 700 is to continue, the controller 502 may cause a substrate 410 containing a plurality of wells 412 to be moved. For instance, the controller 502 may control a motor or other actuator to cause the substrate 410 to be moved such that a different well 412 is positioned to receive fluid from the microfluidic device 520a. In addition, the controller 502 may repeat blocks 704-714 until the controller 502 determines that the method 700 is to end. Following the "no" condition at block 714, the controller 502 may end the method 700 as indicated at block 716.

Although particular reference has been made above to a single microfluidic device 520a, it should be understood that the controller 502 may execute the method 700 on multiple microfluidic devices 520a-520n and on microfluidic devices having multiple sensors and/or actuators.

Figure 8:
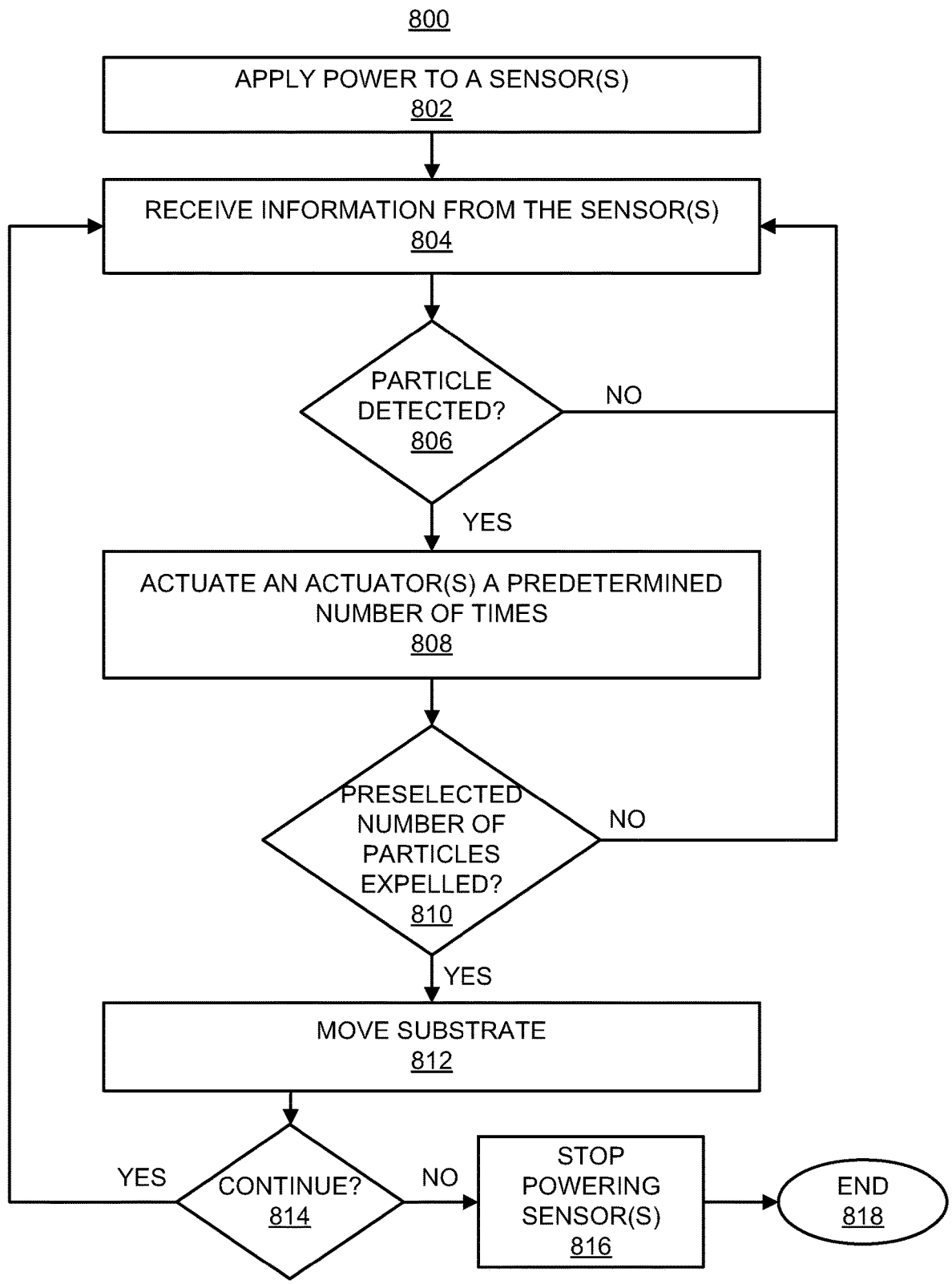

Turning now to FIG. 8, at block 802, power may be applied to a sensor 522a or to multiple sensors 522a-522n. For instance, the controller 502 may supply power to the sensor(s) 522a-522n such that the sensor(s) 522a-522n generates an electric field or other detection field, e.g., a laser beam and photodetector. As noted herein, the sensor(s) 522a-522n may be positioned to detect movement of a particle of interest 140 through a channel 114 of a microfluidic device 520a or multiple channels 114 of multiple microfluidic devices 520a-520n.

At block 804, the controller 502 may receive information from the sensor(s) 522a-522n. For instance, the controller 502 may receive detected impedance information, information pertaining to changes in light detected by a photodetector, or the like.

At block 806, the controller 502 may determine whether the sensor(s) 522a-522n has detected a particle of interest 140. That is, for instance, the controller 502 may determine that a particle of interest 140 has been detected in response to the information received from the sensor(s) 522a-522n indicating an impedance change that exceeds a predetermined value. As another example, the controller 502 may make this determination in response to a change in a detected illumination value exceeding a predetermined value.

In response to a determination at block 806 that a particle of interest 140 has not been detected, the controller 502 may continue to receive information from the sensor(s) 522a-522n at block 804 and continue to determine whether a particle of interest 140 has been detected. However, in response to a determination at block 806 that a particle of interest 140 has been detected, the controller 502 may actuate an actuator 524a or multiple actuators 524a-524n a predetermined number of times to evacuate a predefined volume of fluid through a nozzle 120 or multiple nozzles 120, 304 from the foyer 112 of a microfluidic device(s) 520a-520n as indicated at block 808. According to an example, the predefined volume of fluid is equivalent or nearly equivalent to a total volume of fluid contained in the foyer prior to the foyer being refilled with additional fluid from a fluid slot 110. In other words, the predetermined number of times at which the actuator(s) 524a-524n may be actuated may be equivalent to a number of times that cause all or nearly all of the fluid contained in the foyer 112 at a time when the particle of interest 140 was determined to have moved through the channel 114 and into the foyer 112 to be expelled from the foyer 112.

At block 810, the controller 502 may determine whether a preselected number of particles of interest 140 has been expelled from the microfluidic device(s) 520a-520n. In response to a determination that a preselected number of particles of interest 140 has not been expelled from the microfluidic device(s) 520a-520n, the controller 502 may continue to receive information from the sensor(s) 522a-522n at block 804 and may repeat blocks 806-810 until the controller 502 determines that the preselected number of particles 140 has been expelled at block 810. Thus, for instance, the controller 502 may repeat blocks 804-810 until the preselected number of particles of interest 140 has been delivered into a particular well 412.

In response to a determination that the preselected number of particles 140 has been expelled at block 810, the controller 502 may cause a substrate 410 containing a plurality of wells 412 to be moved as indicated at block 812. For instance, the controller 502 may control a motor or other actuator to cause the substrate 410 to be moved such that a different well 412 is positioned to receive fluid from the microfluidic device(s) 520a-520n.

At block 814, the controller 502 may determine whether to continue the method 800. The controller 502 may determine that the method 800 is to be continued in response to a determination that an additional particle of interest 140 is to be delivered into an additional well 412. In response to a determination that the method 800 is to continue, the controller 502 may repeat blocks 804-814 until the controller 502 determines that the method 800 is to end. Following the "no" condition at block 814, the controller 502 may stop supplying power to the sensor(s) 522a-522n as indicated at block 716. In addition, the controller 502 may end the method 800 as indicated at block 818.

Through implementation of any of the methods 600, 620, 700, and 800, specific quantities of particles of interest, e.g., cells, may be delivered to desired locations, e.g., wells 412 in a substrate 410.

Some or all of the operations set forth in the methods 600, 620, 700, and 800 may be contained as programs or subprograms, in any desired computer accessible medium. In addition, the methods 600, 620, 700, and 800 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A microfluidic apparatus comprising:
   a fluid slot;
   a foyer, wherein the foyer is in fluid communication with the fluid slot via a channel having a relatively smaller width than the foyer, wherein the foyer is shaped to accumulate a number of particles of interest that pass though the channel prior to the particles of interest being expelled from the foyer;
   a sensor to detect a presence of a particle of interest in a fluid passing through the channel;
   a nozzle in fluid communication with the foyer;
   an actuator positioned in line with the nozzle; and
   a controller to receive information from the sensor, the controller including instructions to determine, from the received information, whether the number of particles of interest has passed through the channel and into the foyer, and control the actuator to expel fluid in the foyer through the nozzle in response to the determination.

2. The microfluidic apparatus according to claim 1, further comprising:
a second nozzle in fluid communication with the foyer; and
a second actuator positioned in line with the second nozzle, wherein the controller is to control both the nozzle and the second nozzle based upon the determination.

3. The microfluidic apparatus according to claim 1, wherein the sensor comprises one of metal electrodes and a photodetector.

4. The microfluidic apparatus according to claim 1, wherein the sensor comprises metal electrodes and wherein the metal electrodes are positioned one of outside of the channel and inside of the channel.

5. The microfluidic apparatus according to claim 1, wherein less than all of the fluid contained in the foyer is expelled during an energization of the actuator and wherein the controller is to energize the actuator a predetermined number of times sufficient to expel the particles of interest contained in the foyer.

6. The microfluidic apparatus according to claim 5, wherein the controller is to energize the actuator the predetermined number of times to evacuate a predefined volume of fluid from the foyer, wherein the predefined volume of fluid is equivalent or nearly equivalent to a total volume of fluid contained in the foyer.

7. The microfluidic apparatus according to claim 1, further comprising:
a substrate mechanism supporting a substrate containing a plurality of wells, wherein the controller is to control the substrate mechanism to deposit the expelled fluid into a selected one of the plurality of wells.

8. A method comprising:
applying power to a sensor to detect, at a channel of a microfluidic device, that a particle of interest has moved through the channel and into a foyer of the microfluidic device, wherein the channel has a relatively smaller width than the foyer, and wherein the foyer is shaped to accumulate the preselected number of the particles of interest prior to the particles of interest being expelled from the foyer;
activating an actuator to cause fluid containing the particle of interest to be expelled from the foyer through a nozzle of the microfluidic device;
determining whether the preselected number of particles of interest has moved through the channel and into a foyer of the microfluidic device; and
in response to a determination that a preselected number of particles of interest has moved through the channel and into the foyer, stopping activation of the actuator.

9. The method according to claim 8, further comprising waiting until the actuator is activated a predetermined number of times to evacuate all or nearly all of the fluid contained in the foyer at a time when the particle of interest was determined to have moved through the channel and into the foyer following a determination that the preselected number of particles of interest has moved through the channel and into the foyer and prior to stopping activation of the actuator.

10. The method according to claim 8, further comprising activating a second actuator, wherein activating the actuator further comprises activating the actuator to evacuate a first portion of a fluid contained in the foyer through the nozzle and wherein activating the second actuator further comprises activating the second actuator to evacuate a second portion of the fluid contained in the foyer through a second nozzle from the foyer.

11. The method according to claim 8, further comprising:
in response to a determination that the preselected number of particles of interest has moved through the channel and into the foyer, continuing to activate the actuator until the preselected number of particles of interest has moved through the channel and into the foyer and have been expelled from the foyer.

12. The method according to claim 8, further comprising:
moving a substrate containing a plurality of wells with respect to the nozzle until a selected well of the plurality of wells is positioned to receive the expelled fluid.

13. A microfluidic system comprising:
a fluid slot;
a plurality of microfluidic devices in fluid communication with the fluid slot, wherein each of the plurality of microfluidic devices comprises:
a foyer, wherein the foyer is in fluid communication with the fluid slot via a channel having a relatively smaller width than the foyer, wherein the foyer is shaped to accumulate a preselected number of particles of interest that pass though the channel prior to the particles of interest being expelled from the foyer;
a sensor to detect a presence of a particle of interest in a fluid passing through the channel;
a nozzle in fluid communication with the foyer;
an actuator positioned in line with the nozzle; and
a controller including instructions to, for each of the plurality of microfluidic devices:
activate an actuator to cause fluid contained in the foyer to be expelled through the nozzle;
receive information from the sensor;
determine, from the received information, whether the preselected number of particles of interest has passed through the channel and into the foyer; and
in response to a determination that the preselected number of particles of interest has moved through the channel and into the foyer and have been expelled from the foyer, stop activation of the actuator.

14. The microfluidic system according to claim 13, wherein each of the plurality of microfluidic devices comprises:
a second nozzle in fluid communication with the foyer; and
a second actuator positioned in line with the second nozzle, wherein the controller is to control both the nozzle and the second nozzle based upon the determination as to whether the preselected number of particles of interest has passed through the channel.

15. The microfluidic system according to claim 13, wherein the sensor in each of the plurality of microfluidic devices comprises metal electrodes, and wherein the metal electrodes are positioned one of outside of the channel and inside of the channel in each of the plurality of microfluidic devices.

16. The microfluidic apparatus according to claim 1, wherein the controller is further to:
determine, from the received information, whether the number of particles of interest has passed through the channel; and in response to a determination that the number of particles of interest has moved through the channel and into the foyer and have been expelled from the foyer, stop activation of the actuator.

* * * * *